Aug. 31, 1965    H. S. KATZ ET AL    3,203,849
COMPOSITE HEAT SHIELD
Filed March 31, 1961

INVENTORS
HARRY S. KATZ
JOHN V. MILEWSKI
BY
Thomas W. Brennan
AGENT 3,203,849
COMPOSITE HEAT SHIELD
Harry S. Katz, West Orange, and John V. Milewski, Saddle Brook, N.J., assignors to Thiokol Chemical Corporation, Bristol, Pa., a corporation of Delaware
Filed Mar. 31, 1961, Ser. No. 99,908
1 Claim. (Cl. 161—96)

This invention relates to the production of thermal or heat shields and more particularly to a composite material capable of controlling heat flux or heat flow from a high temperature region so as to protect structures and parts of aircraft and missiles and the like from the effects of the high temperature.

The presently available materials used for the protection of structural parts of aircraft and missiles which are subjected to high temperature such as is found in those areas adjacent or proximate to the exhaust gases ejected from the aircraft or missile engine usually possess heat resistant or insulating qualities. Such materials as asbestos or asbestos based compositions and the like are examples. Though capable of resisting the heat so produced these materials possess a short life cycle and become damaged or are otherwise rendered unserviceable in practice due to their inability to control in an effective manner the quantity of heat flowing therethrough. In such circumstances it becomes necessary either to replace the material at frequent intervals or apply it in heavy, thick sections which results in the disadvantages of increased weight, high cost, and undue complexity.

It is therefore an object of this invention to provide a composite heat shield which overcomes these shortcomings and disadvantages, and is capable of effectively controlling heat flow in a high temperature environmental application.

Another object of the invention is to provide a composite heat shield which is capable of being manufactured in large and complex forms of inexpensive, easily obtainable materials.

Still another object of the invention is to provide a composite heat shield for protecting structural parts of aircraft and missiles from the effects of high temperature exhaust gases of aircraft and missile engines and which is capable of controlling the heat flowing therefrom.

A further object of the invention is to provide a composite heat shield which takes the form of alternate layers of heat insulating material and heat conducting material so that heat passing through the heat insulating layer is conducted through the heat conducting layer in a manner such that a greater portion of the heat flows in a direction substantially normal to the direction of heat flow through the insulating layer.

A still further object of the invention is to provide a composite heat shield in which the insulating layer is capable of imparting an adhesive bond to the heat conducting layer upon being heat treated, or placed under pressure or a combination thereof.

An additional object is to provide a composite heat shield in which the insulating layer is composed at least in part of plastics, resins or resinous materials, ceramics and the like, and in which the conducting layer is composed of materials such as graphite, copper, aluminum and the like.

With the above objects in view and with other objects and advantages as will become apparent from the detailed description, what is intended to be protected by Letters Patent consists of a composite heat shield and equivalents thereof as hereinafter described and illustrated in the attached drawing.

In the drawing wherein is shown the preferred but not the only forms of the invention, it being understood that many forms thereof can be constructed by a person skilled in the art while still remaining within the scope of the invention.

Figure 1:
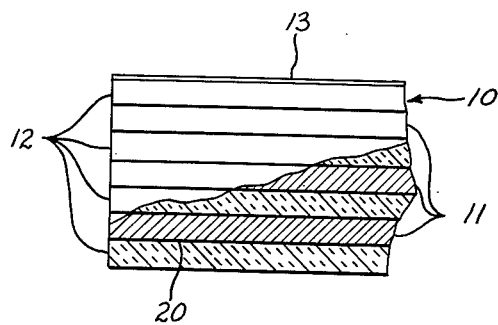
FIGURE 1 is a sectional view of the composite heat shield of the invention in generalized form.

Referring to the drawings, in FIGURE 1 is a generalized form of a composite material 10 comprising alternately arranged layers or laminates 11, 12. The layers 11 are composed of heat insulating material while the alternate layers 12 are of opposite characteristics, i.e., are good heat conductors. Also in FIGURE 1 in the upper end thereof is a single layer 13 which is best made of a high heat conducting material such as metallic foil. This particular layer serves the two fold purpose of acting as a final heat sink and adding a decorative appeal to the material's surface where such is deemed desirable.

While it is envisoned that any materials having the above described characteristics are useable in the layers or laminates of this invention, it is, of course, preferable to select them in relation to the particular application so that the maximum beneficial results may be realized. In like manner the total number of layers is decided upon, although in this particular other factors enter into the decision. For instance, the choice of assembling a heat shield containing many thin layers must often be weighed against a choice of fewer but thicker layers. In some applications the latter is desirable but a general rule is that the higher the temperature of the heat source the greater the number of layers of a given thickness. Thus it is usually more beneficial to thin out the layers (for example, layers 12 of FIG. 1 may consist of a metallic foil similar to outer layer 13 and utilized in thickness of 2 mils or less) and increase their number for a given total heat shield thickness than the opposite choice of increased thickness with fewer layers. The final choice in any event is determined in large measure by the application.

Materials useable for the alternately arranged layers making up the invention include in its broadest aspects any heat conducting material and any heat insulating material. It is preferred for purposes herein to use those materials known as plastics, more specifically the plastics known as synthetic resins, either thermosetting or thermoplastic for the insulating layers, metals such as aluminum, copper, molybdenum, tungsten and certain non-metallic materials such as graphite and the like for the conducting layers, are within the scope of the invention and quite useable.

Figure 2:
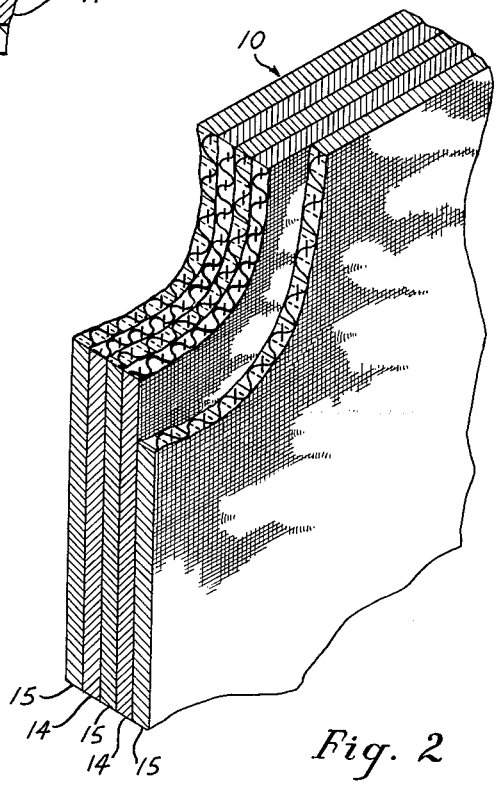
FIGURE 2 is a perspective sectional view of a more specific form of the invention.
Figure 3:
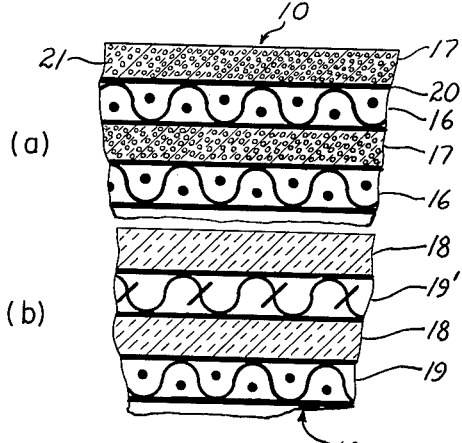
FIGURE 3 is a partial, sectional view of two additional forms of the invention.

A particular structure in accordance with the invention is a composite heat shield of fiberglass cloth impregnated with a thermosetting plastic or resin alternately arranged in several layers with graphite cloth (FIGURE 2). The particular plastic selected was a thermosetting epoxy resin curable upon heating under pressure in a suitable press. In FIGURE 2 the insulating layers 15 of the heat shield 10 are formed of fiberglass cloth impregnated with an epoxy, while the conducting layers 14 are composed of graphite woven into a cloth-like form. In this instance the thermosetting plastic epoxy resin was chosen to achieve a heat shield of greater strength and stress resistance, combined with flexibility in addition to heat flow controlling characteristics although other materials can serve in like manner. In addition, use of the plastic as above described imparts an adhesive bond 20 (FIGURES 1 and 3) between the layers as the material cures thereby preventing unwanted (in the usual application) relative movement between or separation of the layers. However, the adhesive bond 20 can be achieved in other ways as by the separate application of any cementitious material as desired consistent with the application of the finished heat shield.

FIGURE 3(a) and (b), illustrates other forms of the invention. In FIGURE 3(a) the usual alternating layers as hereinbefore described are shown. In this instance the usual layer 17 has dispersed therethrough minute Microballoon spheres 21 which are thin-walled hollow spheres made of suitable materials such as a phenolic, urea resin, glass or silica, produced in any size range of 5 to 300 microns, available commercially under the trade designation BJO–0930 by the Bakelite Division of Union Carbide Corporation. Microballoon is also a registered trademark of the Standard Oil Company of Ohio. The Microballoon spheres 21 are dispersed throughout the resin before curing while it is in a liquid or semi-liquid state and add to the layer a greatly increased insulating quality. The conducting layers 16 are shown in FIGURE 3(a) in the form of wire mesh or screening of preferably metallic substance such as aluminum or copper and the like, the particular metal selected being determined by the end use to which the invention is put.

FIGURE 3(b) is yet another form of the invention wherein the insulating layer 18 is similar to that of FIGURE 1 and can be any material capable of insulating against heat. Additional materials suitable for use in this layer are other resins including the phenolics, fluorocarbons, silicones, polyethylene and polyamides. Materials such as ordinary wood, asbestos, glass and the like can also be used where flexibility, light weight and high strength are of secondary importance. The conducting layers 19, 19' need not be similar in a given heat shield but may be made from different types of conductive material and in different forms. Illustrative of such a heat shield in which is retained the alternate layer arrangement as before but in which the conductive wire mesh or screen of FIGURE 3(a) and the conductive graphite cloth of FIGURE 2 are combined in the same composite heat shield in FIGURE 3(b). In a similar manner the insulating layers may also be changed in the same composite heat shield so long as the alternate layer arrangement is adhered to.

This invention is primarily useful in protecting or shielding from the effects of heat any part of a vehicle which requires such protection. Such usefulness includes the covering of heat sensitive radio and electronic equipment aboard flying missiles which are mounted in high temperature regions thereof such as the rearward sections adjacent or proximate to the rocket or jet engine exhaust. Other uses include nose cones of the missile itself in which use as will be shown it is exceptionally adaptable.

The invention also finds use, aside from its application to heat shielding and controlling as herein described, in the electrical field. As is well known materials which are good heat insulators and/or heat conductors are usually equally good electrical insulators and/or conductors. Thus this invention finds extensive use though in a somewhat different manner in the field of electricity as will be hereinafter set forth.

A typical example further illustrative of the manner of operation of the invention, though not limiting its scope is set forth below, it being understood that the invention can be achieved in any form consistent with the usual tools, mandrels, molds and the like well known to one skilled in the art to which the invention pertains. Therefore it is apparent that the invention can be carried out in the form of flat, curved and contoured sheets and sections and in other shapes and forms of varying complexity and scope. Its constituent layers may be made in thicknesses ranging from thin films to thicknesses limited only by the application, so long as the alternately arranged structure is maintained in accordance herewith.

A sample of fiberglass cloth preimpregnated with a thermosetting epoxy resin and modified for use at high temperature with a phenolic resin such as a product commercially available and sold by the Shell Chemical Division of the Shell Oil Corporation under the trade designation "Shell 422," was prepared in alternate layers with a graphite cloth until the desired number of layers (in this example 6 layers of epoxy-fiberglass, 5 layers of graphite cloth) was obtained. In preparing the layers by placing one upon the other the graphite layers were slightly wetted by means of a high temperature liquid phenolic resin for interlayer bonding strength. The sample thus formed was cured by being heated under a pressure of approximately 1000 p.s.i. in a press for one-half hour at temperature 300° F., at 330° F. for an additional one-half hour and at 400° F. for an additional one-half hour. The finished product was then removed from the heating press and cooled gradually to room temperature. In final form the composite heat shield was a strong, flexible material approximately one-eighth inch in overall thickness.

The invention as typified above for illustrative purposes included as the insulating layer a thermosetting resin, or a resinous material which "cures" or "sets" upon sufficient heat. In the usual practice with such materials, a second substance is used to assist or entirely effect the cure. The second substance may be added separately as a liquid, or in the form of powder and mixed in situ prior to assembling the layers in alternating arrangement with the conducting layers. In conjunction therewith an adhesive resin such as the phenolic resin supplied by the Monsanto Chemical Company under the trade designattion SC 1008 is applied to maintain the layers in intimate contact with each other. In this way the invention may readily be achieved in bulk form thereby rendering it highly producible in automatic processing systems. In other cases certain room tempearture setting epoxy resins containing an aliphatic amine catalyst such as triethylene tetramine are often used. Other materials for this purpose are phenol-formaldehyde, urea-formaldehyde and mixtures thereof, and also "accelerators" or "roomsetting" resins may be added to the base resin to produce the invention at low or room temperatures, and at negligible pressures as low as atmospheric.

Other types of plastics or resins known as "thermoplastics" are also quite useable in achieving the invention. Prime examples of this class of materials are the polyfluorocarbons which are commercial products sold under the trade designations, Teflon (Du Pont Corporation) and KEL-F (Minnesota Mining and Manufacturing Corporation) polyethylene, and polyamides such as nylon (Du Pont Corporation). In using these materials it is only necessary to procure the desired thermoplastic in whatever thickness required, build up the heat shield in the usual alternately arranged layers, apply heat (from about 100° F. to about 750° F., depending upon the thermoplastic material) sufficient to soften the thermoplastic thereby permitting the conductive layers to penetrate therein, the degree of penetration being determined by the degree of pressure applied in the process with pressures as high as 3000 p.s.i.g. and even 10,000 p.s.i.g. are possible using the so called "bag-molding" technique. In like manner the insulating layer made as above can be procured in the form of, say, asbestos woven cloth immersed in or impregnated with a thermoplastic and arranged with the conductive material in alternating relationship as before. Other thermoplastics available commercially are useable in a similar manner.

A typical application of the invention is in the fabrication of nose cones of high speed missiles and the like which, because of the high velocity attained by such vehicles upon leaving and re-entering the atmosphere are subjected to very high temperatures due to friction. Most such missile nose cones presently used are made with ablative materials which being heated upon re-entry soak up the heat so produced and melt in a predictable manner. Upon melting the material falls away from the nose cone exposing more material which in turn also melts and falls away in an ablative manner. This process continues until the missile arrives at its destination or slows sufficiently to decrease the heat to which the nose cone is exposed terminating the ablative process. However, during its flight through the atmosphere the high temperature and therefore the ablation is generally confined to the extreme forward sections of the nose cone decreasing toward the rearward sections, due to the heat insulation characteristics of the material used in the manufacture of the nose cone. The heated region during the re-entry flight being thus confined, the rearward portions (or "skirt") of the nose cone remain relatively cool. Since these rearward portions are of larger area and are not contributing to the dissipation of the heat encountered, the control thereof is often times inadequate. It is in this void in the area of heat flow control that this invention of a heat shield is most eminently suited.

In operation as a nose cone material the same high temperature on re-entry to the atmosphere is encountered by the missile. The forward portions thereof again are subjected to rapid heating which attacks the outside layer of the heat shield of the invention herein described which is, in this application, of insulating material. This layer becomes greatly heated and the heat flows therethrough in all directions, but because of its insulating qualities, a greater portion flows through to the second layer which in turn becomes heated. Because of the heat conducting characteristics of this layer the heat which flows in all directions throughout the layer is dissipated therethrough including flowing to and heating the rearward portions of the nose cone. In this manner it is seen that heat flow control is effected by causing a greater portion of the heat to flow in a direction approximately normal to its original direction until, in accordance with the second law of thermodynamics, the cooler regions of the nose cone, i.e., the rearward or skirt sections become heated. However, since a portion of the heat taken on flows inwardly to the next (insulating) layer a heating thereof takes place, though at decreased rate in similar fashion with the exception that again a greater portion of the heat taken on by this (heat insulating) layer passes through the layer in the direction of its thickness whereupon it is once again taken on by the next conducting layer. In like manner the flow of heat is again changed so that a greater portion will flow in a direction normal to its direction of entry into the layer. By proper selection of materials it is possible to shield or protect the missile nose cone from the effects of re-entry atmospheric heat to a degree not heretofore possible. In this use selection of materials for the insulating layers is based on their high temperature qualities. Suitable materials are silicone resin impregnated quartz or ceramic, asbestos phenolic resins such as 150 RPD, a product of the Raybestos Manhattan Corporation and the like.

As an improvement in the electrical arts the material takes on further unique usefulness not heretofore available. As a particular example, the epoxy-fiberglass cloth laminated alternately with graphite cloth and described in detail above exhibits electrical properties not obtainable before. In a specific test the sample material exhibited a very high resistance to the flow of electrical current (above 2,000,000 ohms) when tested across its thickness, i.e. across the layers. However, when tested through the layers, i.e. edge to edge through a distance of approximately two inches a resistance of only 2 ohms was measured. Hence, there is presented by the existence of this invention means for producing an electrical conductor which is self-insulating and ready for use upon the making of proper electrical connections, since the composite heat shield can be assembled in circular or annular form, it being only necessary to adhere to the alternate arrangement of layers or laminations.

The invention having been disclosed, it should be understood that the illustrative embodiments shown and described may be variously modified and departed from without departing from the scope and spirit thereof except as indicated in the following claim.

What is claimed is:

A composite heat shield comprising a plurality of alternately arranged, integrally united, layers of heat insulation and heat conducting material, said insulating layers being identical and each comprising a fibrous cloth coated with a synthetic resin film and said heat conducting layers being identical and each comprising a heat conductive, open mesh, woven cloth of graphite threads coated with a second high temperature modifying synthetic resin film, said resins being curable upon heating to effect an adhesive bond between each of the layers.

References Cited by the Examiner

UNITED STATES PATENTS

| | | | |
|---|---|---|---|
| 2,439,137 | 4/48 | Keller | 154—44 |
| 2,561,891 | 7/51 | Tucker | 161—84 |
| 2,688,576 | 9/54 | Ryan et al. | |
| 2,748,019 | 5/56 | Schramm | 156—276 |
| 2,759,522 | 8/56 | Limm | 156—276 X |
| 2,806,509 | 9/57 | Bozzacco et al. | 154—45.9 |
| 2,911,038 | 11/59 | Frommelt | 154—44 |

ALEXANDER WYMAN, *Primary Examiner.*

EARL M. BERGERT, MORRIS SUSSMAN, CARL F. KRAFFT, *Examiners.*